Figure 1:
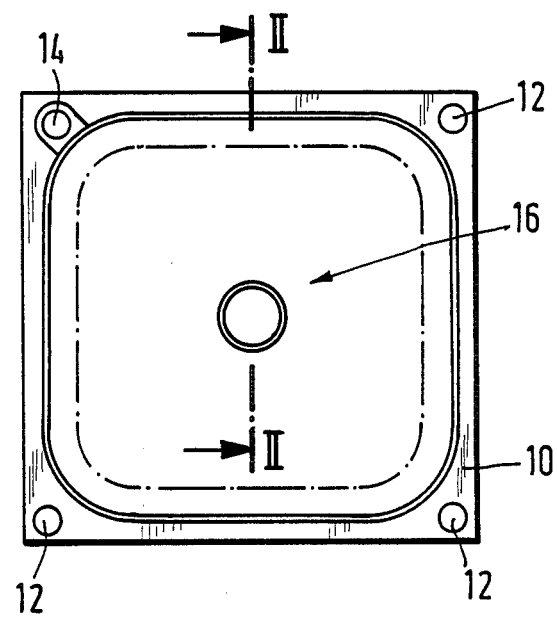

United States Patent [19]

Stanik

[11] Patent Number: 4,781,829
[45] Date of Patent: Nov. 1, 1988

[54] MEMBRANE FILTER PLATE FOR A FILTER PRESS OR THE LIKE WITH SUPPORT BOSE BOSSES

[76] Inventor: Reimund Stanik, Bischof-Ketteler-Strasse, 10,8952 Marktoberdorf, Fed. Rep. of Germany

[21] Appl. No.: 866,964

[22] Filed: May 27, 1986

[30] Foreign Application Priority Data

Feb. 25, 1986 [DE] Fed. Rep. of Germany ....... 8605058
Apr. 29, 1986 [EP] European Pat. Off. ......... 86105922.8

[51] Int. Cl.⁴ .............................................. B01D 25/12
[52] U.S. Cl. .................................... 210/231; 100/199; 100/295; 210/224
[58] Field of Search .............. 100/199, 295, 113, 194, 100/197, 211; 210/224–231

[56] References Cited

U.S. PATENT DOCUMENTS

| | | | |
|---|---|---|---|
| 3,543,938 | 12/1970 | Busse et al. | 210/231 |
| 4,052,314 | 10/1977 | Busse et al. | 210/231 X |
| 4,229,304 | 10/1980 | Fismer | 210/231 |
| 4,379,051 | 4/1983 | Hiesinger et al. | 210/231 |

FOREIGN PATENT DOCUMENTS

| | | | |
|---|---|---|---|
| 0081715 | 6/1983 | European Pat. Off. | |
| 2323516 | 11/1974 | Fed. Rep. of Germany | 210/231 |
| 8516901 | 9/1985 | Fed. Rep. of Germany | |
| 2063697 | 6/1981 | United Kingdom | 210/231 |
| 2069358 | 8/1981 | United Kingdom | 210/231 |

Primary Examiner—Richard V. Fisher
Assistant Examiner—W. Gary Jones
Attorney, Agent, or Firm—Hill, Van Santen, Steadman & Simpson

[57] ABSTRACT

A membrane filter plate for a filter press with a one-piece, plastic carrier plate, at least one membrane arranged on one side of the carrier plate and provided with spacing bosses for the engagement of a filter cloth and a sealing rim surrounding the carrier plate and the membrane and connecting the same in substantially fluid-tight manner. The sealing surface of the sealing rim parallel to the carrier plate median plane being arranged on the side having the membrane or on either side of the carrier plate. At least one support boss is provided in the central region of the carrier plate. The end face of the support boss parallel to the carrier plate median plane being substantially aligned with the sealing surface of the sealing rim parallel to said median plane and provided laterally with a rotationally symmetrical transition surface facing the membrane which slopes in the direction of the carrier plate median plane. The support boss 16 is constructed in one piece with the carrier plate 18 at least in its area adjacent to the carrier plate median plane 22. The transition surface 30 of the support boss 16 runs from a connecting line 26 of membrane 28 to the support boss 16 for producing one desired bending line 32, 34 initially substantially parallel to the carrier plate median plane 22, then slopes towards the same under an angle of 3° to 15° and then again extends parallel to the carrier plate median plane 22.

11 Claims, 4 Drawing Sheets

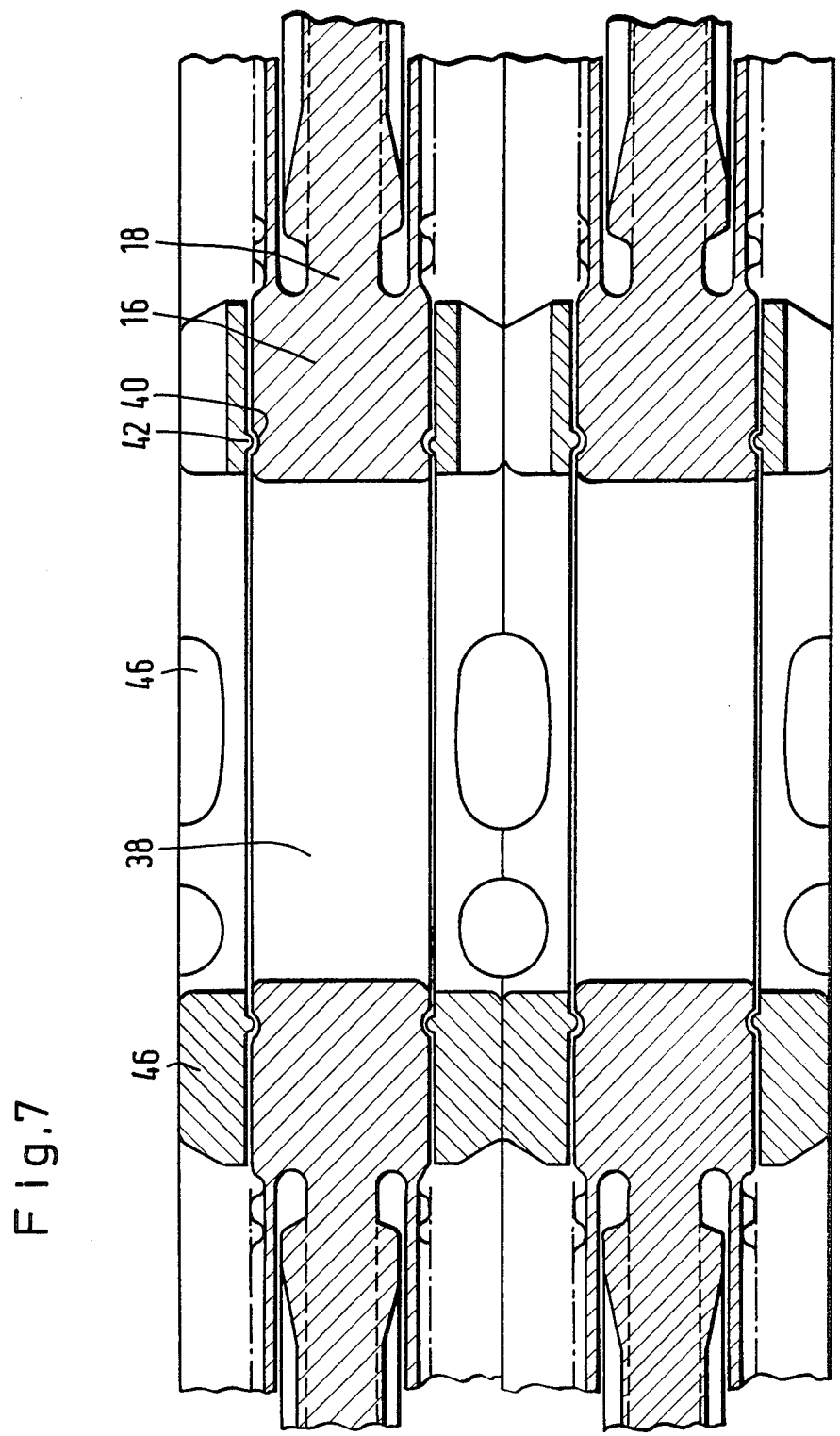

MEMBRANE FILTER PLATE FOR A FILTER PRESS OR THE LIKE WITH SUPPORT BOSE BOSSES

The present invention relates to a membrane filter plate for a filter press or the like, with a one-piece, plastic carrier plate, at least one membrane arranged on one side of the carrier plate and preferably provided with spacing bosses or the like for the engagement of a filter cloth or the like and a sealing rim surrounding the carrier plate and the membrane and connecting the same in substantially fluid-tight manner, the sealing surface of the sealing rim parallel to the carrier plate median plane being arranged on the side having the membrane or on either side of the carrier plate at a distance from the plane of the membrane in the normal unloaded position thereof, at least one support boss constructed at least partly in one piece with the carrier plate is provided in the central region of the latter and which is rotationally symmetrical to a normal to the carrier plate median plane, the end face of the support boss parallel to the carrier plate median plane being substantially aligned with the sealing surface of the sealing rim parallel to said median plane and provided laterally with a rotationally symmetrical transition surface facing the membrane and which slopes in the direction of the carrier plate median plane.

EP-OS No. 0 081 715 describes a membrane filter plate or more correctly membrane chamber filter plate of the aforementioned type, in which in the case of a correspondingly large plate diameter support bosses are provided. In general, membrane chamber filter plate with a central intake are known, in which the filter level is supported by means of a plurality of support bosses located outside the central intake, or, as in the case of the membrane filter plate of EP-OS No. 0 081 715, a corner feed or intake is provided, which offers the advantage of a large, free membrane with an invariable intake cross-section. In addition, the filter cake is not interrupted, because the intake which disturbs it is located outside the filter level in a corner feed bore or roughly in the centre of one side of the sealing rim between two corner bores.

The above-described membrane filter plate has proved satisfactory, but as a result of the symmetrical filtration behaviour, the central intake is very advantageous in certain applications.

The problem of the present invention is to further develop the aforementioned prior art membrane filter plate in such a way that, with minimum constructional and labour costs, an adaptation to both corner feed and central feed application can be ensured using an all-solid plastic carrier plate with support bosses connected in one piece therewith without any variation to the actual plate manufacture.

In the case of a membrane filter plate of the aforementioned type, this problem is solved according to the invention in that the support boss is constructed in one part with the carrier plate at least in its region adjacent to the median plane of the carrier plate and that the support boss transition surface from a connecting line of the membrane to the support boss initially runs substantially parallel to the carrier plate median plane for producing in each case one desired bending line for the filtration or squeezing phase and then slopes towards the same under an angle of 3° to 15° and preferably 10° to 15°, after which it again extends parallel to the carrier plate median plane or, whilst avoiding clearly defined bending lines, is constructed as a bevel surface with a continuously varying bend configuration from the connecting line into the carrier plate surface.

It can be provided that on the end face of the support boss parallel to the carrier plate median plane is connected a rotationally symmetrical sloping lateral surface, which drops away to the connecting line of the membrane to the support boss.

According to the invention, it is also possible to provide the support boss with a central bore passing through the complete carrier plate and which communicates via openings provided in the lateral face with the particular filter chamber.

The invention also proposes that the support boss is constructed in one piece with the carrier plate.

It can also be provided that the lateral surface of the support boss is part of a support ring mounted on the carrier plate after abrading, preferably milling off the support boss originally produced in one piece with the carrier plate down to the plane of the bearing surface of the membrane for the filter cloth.

According to another embodiment of the invention, the support ring is screwed to the carrier plate and the support ring can be constructed as a filter cloth screw coupling.

The invention also optionally proposes that the carrier plate has a centering slot in the engagement region of the support ring in which engages a complementary centering bead of the support ring or vice versa. The invention also optionally proposes that the centering bead is constructed as a mounting support for the filter cloth.

Finally, the invention also proposes that only one support boss arranged centrally on the carrier plate is provided.

The present invention avoids the disadvantages of the aforementioned, known membrane filter plate systems. Instead of these a membrane chamber filter plate with a variable feed or intake is provided, which in the vicinity of the support boss fundamentally realises the "double hinge principle" or the principle of avoiding clearly defined bending lines, as described in EP-OP No. 0 081 715 in conjunction with the sealing rim, so that reference should be made to the description thereof. The membrane surface is provided with spacing bosses and the carrier plate surface can be profiled in order to permit coolability and heatability, as is also described in EP-OS No. 0 081 715. Naturally, it is not only possible to construct the carrier plate in one piece with the membrane, it also being possible to provide a replaceable membrane, as described in German utility model No. 85 16 901.

As the central support boss (naturally two or more support bosses could be provided in the case of correspondingly large plates) holds the filter level or surface, it is possible to produce larger membrane plates, with dimensions of more than 1200×1200 mm, with corner feed or outside feed, without requiring as has hitherto been the case with relatively small dimensions for support bosses, which interrupt the filter cake or shorten the free membrane length. The central support boss is constructed in such a way that by means of a few operations it can be converted to central feed, namely by e.g. milling of and if necessary fitting a support ring, so that in accordance with the customer's requirements the same membrane plate can be manufactured with central feed or a feed outside the filter surface level. The central support boss is preferably constructed in such a way that it can be provided with supporting filter cloth screw coupling or with a central intake support, so that the endangered intake region is supported and cannot move during filtration. In summarizing, it can be stated that the membrane filter plate according to the invention can be modified for several different intake systems without any significant labour and other costs, the filter surface is supported with only a single support boss, whilst ensuring long membrane paths, due to the supporting of the membrane, there are no interruptions to the filter level with central feed, because there is self-supporting of the latter enabling an uninterrupted cake structure. There is also a larger filter volume through the omission of the hitherto necessary plurality of support bosses. Around the support boss there is no premature breaking of the membrane due to the weak points otherwise unavoidably associated with the support bosses.

Further features and advantages of the invention can be gathered from the following description of non-limitative embodiments with reference to the attached drawings, wherein show:

FIG. 1, a first embodiment of a membrane filter plate according to the invention in plan view, partly in section with a corner intake.

Figure 2:
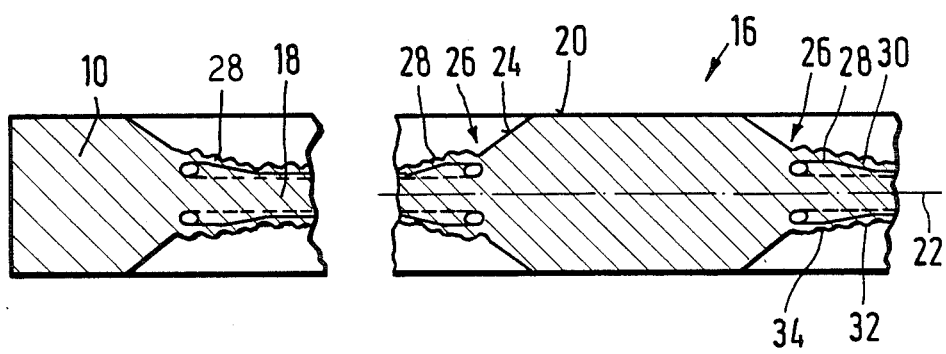

FIG. 2, a section along line II—II of FIG. 1.

Figure 3:
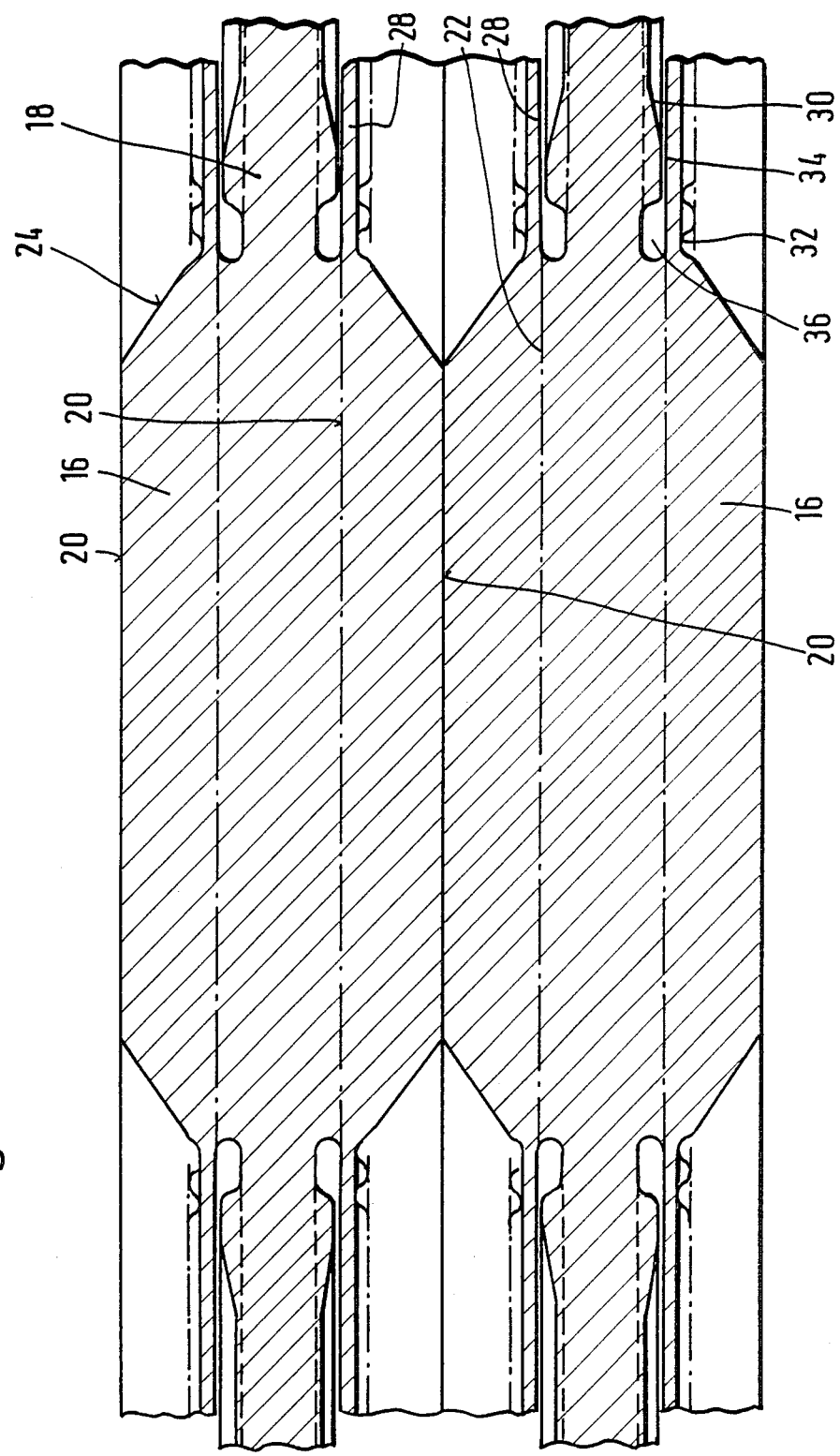

FIG. 3, the support boss region of the embodiment of FIGS. 1 and 2 in larger scale detailed form in a sectional representation like FIG. 2 showing two engaging support bosses of two membrane filter plates interconnected in a filter press.

Figure 4:
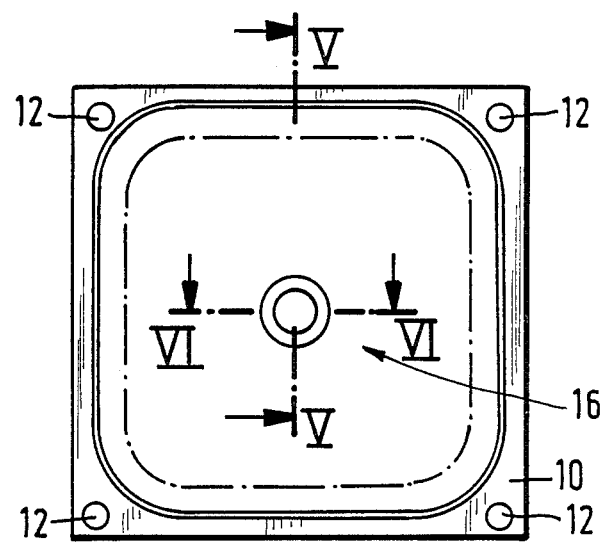

FIG. 4, a second embodiment of a membrane filter plate according to the invention with central intake in plane view.

Figure 5:
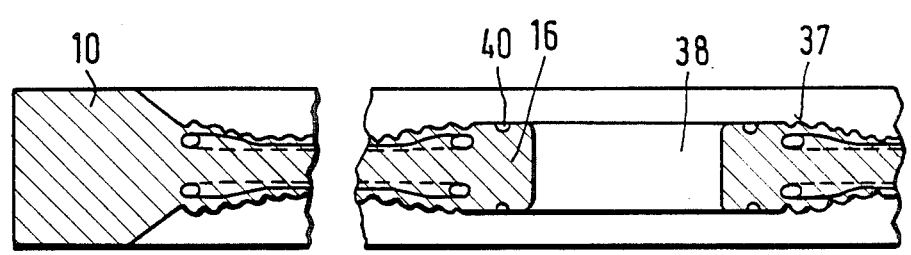

FIG. 5, a section along line V—V of FIG. 4.

Figure 6:
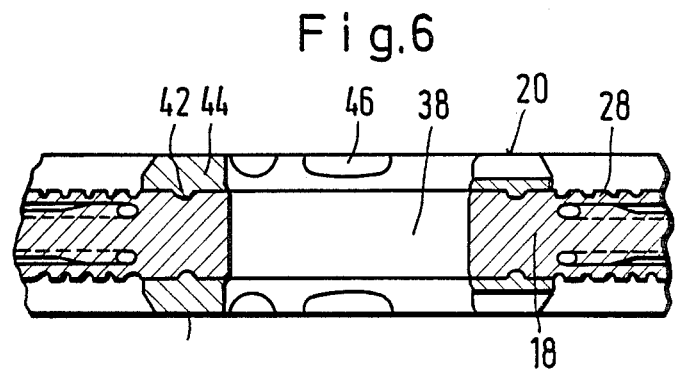

FIG. 6, a section along line VI—VI of FIG. 4 and unlike in the latter the central intake is surrounded by a support ring.

FIG. 7, the support ring region of the embodiment of FIG. 6 on a larger scale, showing two membrane filter plates which are interconnected in a filter press.

As shown in FIG. 1, the membrane filter plate has an all-round sealing rim 10, which is provided with corner bores 12 and with a corner intake or feed bore 14. In the central region of the membrane filter plate is provided a support boss 16. The complete membrane filter plate, or more correctly carrier plate, because the filter cloth to be fitted is not shown in FIG. 1, is made in one piece from solid plastic, including the support boss 16 and, apart from the construction of the latter and the regions linked therewith, corresponds to a membrane filter plate as described in EP-OS No. 0 081 715, to which reference is made with respect to the operation of such membrane filter plates.

FIG. 2 shows that the sealing rim 10 in its engagement region for a membrane 28 is constructed in the manner described in EP-OS No. 0 081 715, i.e. with a bevel surface with a substantially continuously varying curvature between the connecting line of membrane 28 to sealing rim 10 and the substantially planar central region of carrier plate 18. FIG. 2 shows that support boss 16 has a planar end face 20 extending parallel to the carrier plate median plane 22. To the end face 20 of support boss 16 is laterally connected a lateral face 24 rotationally symmetrical to the carrier plate median plane 22, which slopes to the central normal of the support boss 16. Following onto the connecting line 26 of membrane 28, which is profiled in known manner, cf EP-OS NO. 0 081 715 to the support boss 16, the carrier plate 18 is provided with a transition surface 30 which, for producing in each case one desired bending line 32 for the filtration phase and one desired bending line 34 for the squeezing out phase, viewed from the central normal of the support boss 16, runs substantially parallel to the carrier plate median plane 22, then slopes at an angle of approximately 10° to 15° towards said median plane 22 and then extends substantially parallel to said plane 22. Instead of this, it is also possible for bringing about the "double hinge action" produced by the desired bending lines 32, 34 and to which detailed reference is made in EP-OS No. 0 081 715 relative to the sealing rim so that reference should be made thereto, a bevel surface with a continuously varying curvature can be provided.

FIG. 3 shows the aforementioned circumstances in detail illustrating how two support bosses 16 of two membrane filter plates resting upon one another in a filter press engage in supporting manner on one another with facing end faces 20, the not shown filter cloth naturally being held between the engaging end faces 20 of the two support bosses 16. FIG. 3 also clearly shows a flash groove 36, whose function is the same as that as described in EP-OS No. 0 081 715 regarding the sealing rim construction.

In the case of the modified embodiment shown in FIG. 4 of the membrane filter plate according to the invention, the sealing rim 10 has four corner bores 12, so that there is no corner intake, all of them being used for the interconnection of stacked membrane filter plates in a filter press or the like. The single, central support boss 16 is, as shown in FIG. 5, milled substantially up to the bearing surface 37 of membrane 28 remote from the carrier plate median plane 22 and is provided in its ring surface with a centering groove 40, in which engages a centering bead 42 of a support ring 40 surrounding a central bore 38 passing through the entire carrier plate 18 and is provided with openings 46 in lateral face 24 ensuring a communication between the central bore (central intake bore) 38 with the filter chamber.

The aforementioned membrane filter plate can therefore be provided, as in the embodiment shown in FIGS. 1 to 3, with a "left behind" support boss 16 produced during the casting process, so that there is a corner intake or feed 14. In this case the central support boss 16 has the advantage compared with the hitherto used multiple support bosses that the free membrane distance between sealing rim 10 and support boss 16 is long in an optimum manner, so that wide, unloaded membrane movements are possible. The other possibility, as with the embodiment according to FIGS. 4 to 7, is to use the support boss simultaneously for providing a central intake 38, there preferably simultaneously being a filter cloth screw coupling, as shown in the drawings. The leads to the additional advantage that no further flow path impediments occur laterally of the central intake.

The features disclosed in the description, drawings, and claims can be essential to the realisation of the various embodiments of the invention either singularly or in random combinations.

LIST OF REFERENCE NUMERALS 10 sealing rim
12 corner bore
14 corner intake bore
16 support boss 18 carrier plate
20 end face
22 carrier plate median plane
24 lateral face
26 connecting line
28 membrane
30 transition surface
32/34 desired bending line
36 flash groove
38 central bore
40 centering groove
42 centering bead
44 support ring
46 opening

I claim:

1. In a membrane filter plate for a filter press with a one-piece, plastic carrier plate, at least one membrane arranged on one side of the carrier plate and provided with at least one spacing boss having an end face for the engagement of a filter cloth and a sealing rim having a sealing surface surrounding the carrier plate and the membrane and connecting the same in substantially fluid-tight manner, the sealing surface of the sealing rim parallel to the carrier plate median plane being arranged on the side having the membrane or on either side of the carrier plate at a distance from the plane of the membrane in a normal unloaded position, at least one support boss constructed at least partly in one piece with the carrier plate is provided in the central region of the latter and which is rotationally symmetrical to a normal to the carrier plate median plane, the end face of the support boss parallel to the carrier plate median plane being substantially aligned with the sealing surface of the sealing rim parallel to said median plane and provided laterally with a rotationally symmetrical transition surface facing the membrane and which slopes in the direction of the carrier plate median plane, the improvement comprising the support boss 16 being constructed in one piece with the carrier plate 18 in its area adjacent to the carrier plate median plane 22 and the transition surface 30 of the support boss 16 running from a connecting line 26 of membrane 28 to the support boss 16 for producing in each case one desired bending line 32, 34 for filtration phase initially substantially parallel to the carrier plate median plane 22, then sloping towards the same under an angle of 3° to 15°, and then again extending parallel to the carrier plate median plane 22, and the support boss 16 being provided with a central bore 28 passing through the complete carrier plate 18 and communicating via openings 46 in lateral face 24 with the particular filter chamber.

2. Membrane filter plate according to claim 1, the improvement further comprising a rotationally symmetrical smooth and sloping lateral face 24 following onto the end face 20 of support boss 16 parallel to the carrier plate median plane 22 and dropping away towards the connecting line 26 of membrane 28 to support boss.

3. Membrane filter plate according to claim 1, the improvement further comprising the complete support boss 16 being constructed in one piece with the carrier plate 18.

4. Membrane filter plate according to claim 1, the improvement further comprising the lateral face 24 of support boss 16 being part of a support ring 44 after abrading, the support boss 16 originally produced in one piece with the carrier plate 18 to the plane of a bearing surface of the membrane 28 and which is mounted on the carrier plate.

5. Membrane filter plate according to claim 4, the improvement further comprising the support ring 44 being screwed to the carrier plate 18.

6. Membrane filter plate according to claim 5, the improvement further comprising the support ring 44 being constructed as a filter cloth screw coupling.

7. Membrane filter plate according to claim 4, the improvement further comprising in the engagement region of support ring 44, carrier plate 18 having a centering groove 40, engaging a complementary centering bead 42 of support ring 44 or vice versa.

8. Membrane filter plate according to claim 7, the improvement further comprising the centering bead 42 being constructed as a mounting support for the filter cloth.

9. Membrane filter plate according to claim 1, the improvement further comprising there is only one single support boss 16 being arranged centrally on the carrier plate 18.

10. Membrane filter plate according to claim 1, the improvement further comprising said angle being between about 10° and 15°.

11. Membrane filter plate according to claim 1, the improvement further comprising the transition surface also avoiding clearly defined bending lines being constructed as a bevel surface passing with a continuously varying bend configuration from connecting line 26 into the carrier plate surface.

* * * * *